US012578972B2

(12) United States Patent
Singh et al.

(10) Patent No.: US 12,578,972 B2
(45) Date of Patent: Mar. 17, 2026

(54) INTERFACE MANAGEMENT FOR PERIPHERAL DEVICES

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/618,336

(22) Filed: Mar. 27, 2024

(65) Prior Publication Data

US 2025/0306952 A1      Oct. 2, 2025

(51) Int. Cl.
    G06F 9/4401        (2018.01)

(52) U.S. Cl.
    CPC ................................. G06F 9/4411 (2013.01)

(58) Field of Classification Search
    CPC ..... G06F 13/10; G06F 9/4411; G06F 11/2221
    See application file for complete search history.

(56) References Cited

U.S. PATENT DOCUMENTS

| | | | | | |
|---|---|---|---|---|---|
| 6,668,376 | B1 * | 12/2003 | Wang | ................... | G06F 9/4415 717/178 |
| 6,854,054 | B1 | 2/2005 | Kavanagh | | |
| 7,130,997 | B2 | 10/2006 | Hsu | | |

| | | | | | |
|---|---|---|---|---|---|
| 8,136,900 | B2 | 3/2012 | Iwasaki | | |
| 8,346,985 | B2 | 1/2013 | Chassot | | |
| 9,152,402 | B2 | 10/2015 | Scheidel et al. | | |
| 9,875,115 | B2 | 1/2018 | Russinovich | | |
| 9,984,021 | B1 * | 5/2018 | BeSerra | .............. | G06F 13/4221 |
| 9,990,325 | B2 * | 6/2018 | Hetzler | ................. | G06F 21/56 |
| 10,901,627 | B1 | 1/2021 | Bshara | | |
| 11,212,123 | B2 | 12/2021 | Yoon | | |
| 11,282,161 | B2 | 3/2022 | Ray et al. | | |
| 11,489,827 | B2 | 11/2022 | Knotwell et al. | | |
| 11,556,359 | B2 | 1/2023 | Hart et al. | | |
| 11,768,781 | B2 | 9/2023 | Cooray et al. | | |
| 11,770,246 | B2 | 9/2023 | Ong | | |
| 11,775,651 | B2 | 10/2023 | Jacobs | | |
| 12,299,184 | B2 | 5/2025 | Wheeler | | |

(Continued)

OTHER PUBLICATIONS

Seongwook, Jin et al., "Architectual Support for Secure Virtualization under a Vulnerable Hypervisor", 2011 44th Annual IEEE/ACM International Symposium on Microarchitecture (MICRO), Porto Alegre, Brazil, 2011, pp. 272-283 (12 pages).

*Primary Examiner* — Hyun Soo Kim
(74) *Attorney, Agent, or Firm* — WOMBLE BOND DICKINSON (US) LLP

(57) ABSTRACT

Methods and systems for managing interfaces for peripheral devices are disclosed. The peripheral devices may be managed by generating the interfaces after an unknown peripheral device of the peripheral devices is found. The interfaces may be generated by sending configuration data for the unknown peripheral device to an interface generator and receiving the interfaces from the interface generator. The configuration data for the unknown peripheral device may be collected by an agent. The agent may facilitate implementation of the unknown peripheral device to enable use of the unknown peripheral device in a data processing system.

20 Claims, 7 Drawing Sheets

(56) References Cited

U.S. PATENT DOCUMENTS

| 12,353,609 | B2 | 7/2025 | Nelogal | |
| 2004/0210897 | A1* | 10/2004 | Brockway | H04L 67/51 |
| | | | | 717/176 |
| 2007/0198996 | A1* | 8/2007 | Chiu | G06F 9/4411 |
| | | | | 719/321 |
| 2009/0054045 | A1 | 2/2009 | Zakrzewski | |
| 2011/0055541 | A1 | 3/2011 | Lee | |
| 2012/0023319 | A1 | 1/2012 | Chin | |
| 2012/0060023 | A1 | 3/2012 | Park | |
| 2013/0276144 | A1* | 10/2013 | Hansen | H04L 63/08 |
| | | | | 726/29 |
| 2016/0246344 | A1* | 8/2016 | Slavin | G06F 1/28 |
| 2016/0364297 | A1 | 12/2016 | Lo | |
| 2018/0032349 | A1 | 2/2018 | Bhimanadhuni | |
| 2018/0052694 | A1* | 2/2018 | Lee | G06F 13/4022 |
| 2019/0068772 | A1 | 2/2019 | Lo | |
| 2020/0074083 | A1 | 3/2020 | Hou | |
| 2020/0242051 | A1 | 7/2020 | Bisa | |
| 2020/0244445 | A1 | 7/2020 | Ponnusamy | |
| 2020/0250293 | A1 | 8/2020 | Paulraj | |
| 2020/0356669 | A1 | 11/2020 | Kim | |
| 2021/0034132 | A1 | 2/2021 | Hamlin | |
| 2021/0099519 | A1 | 4/2021 | Christian | |
| 2022/0222349 | A1 | 7/2022 | Lambert | |
| 2023/0132176 | A1 | 4/2023 | Nelogal | |
| 2023/0136229 | A1 | 5/2023 | Lee | |
| 2023/0229454 | A1 | 7/2023 | Lagnado | |
| 2023/0259291 | A1 | 8/2023 | Porzio | |
| 2023/0259472 | A1* | 8/2023 | Azam | G06F 9/4411 |
| | | | | 710/113 |
| 2023/0297261 | A1 | 9/2023 | Kim | |
| 2024/0362370 | A1 | 10/2024 | Jain | |

* cited by examiner

Startup Initiation Process 200

Device Inventory Process 202

Unknown Peripheral Device Notification 204

Interface Code
214

Resumed
Device
Startup
Process
216

INTERFACE MANAGEMENT FOR PERIPHERAL DEVICES

FIELD

Embodiments disclosed herein relate generally to managing interfaces for peripheral devices. More particularly, embodiments disclosed herein relate to dynamically generating interfaces for peripheral devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
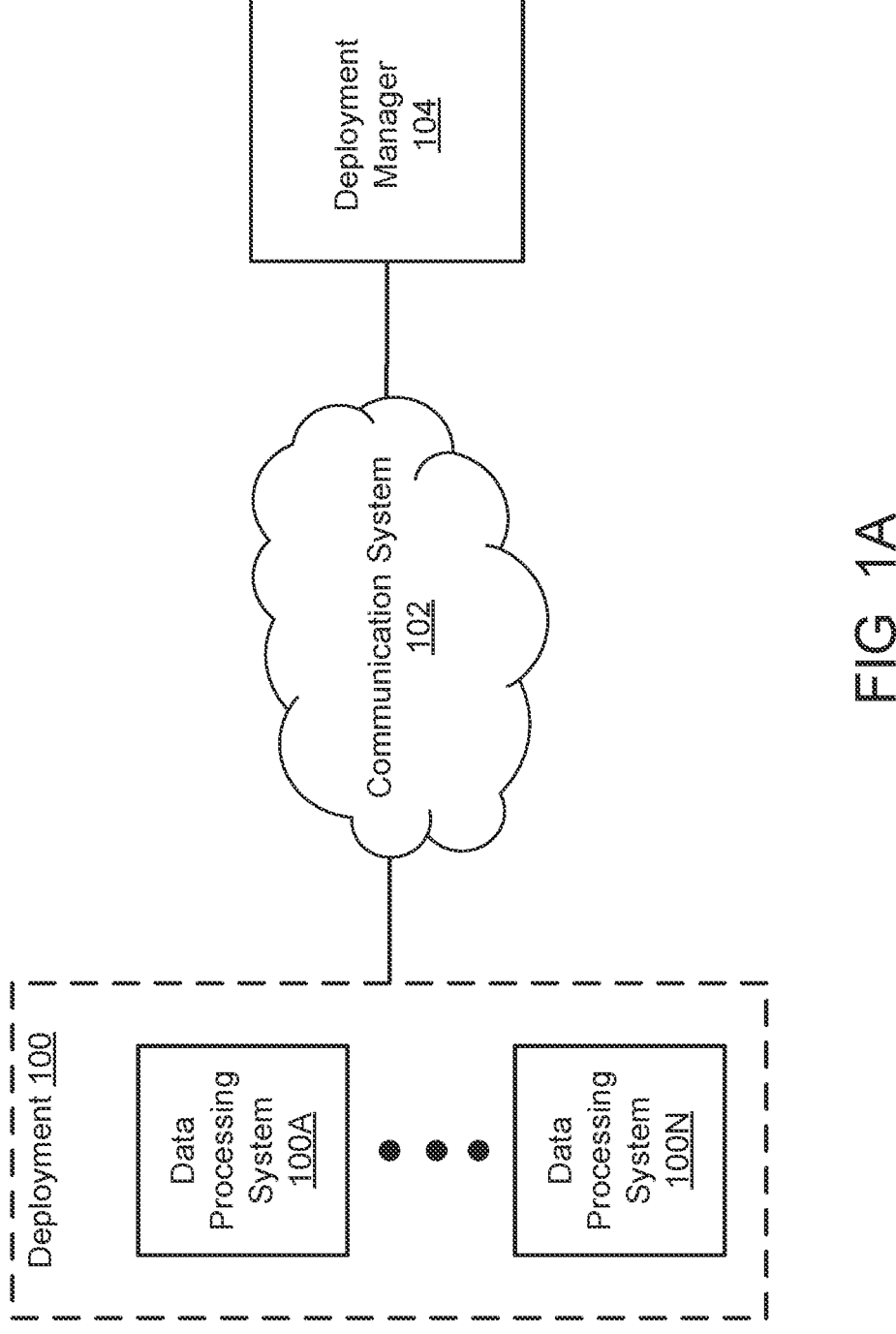
FIGS. 1A-1B shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing interfaces for peripheral devices. The interfaces may be managed by generating the interfaces for an unknown peripheral device of the peripheral devices. The interfaces may be generated by an interface generator that is hosted by a deployment manager.

During a startup of a data processing system, the peripheral devices connected to the data processing system may be enabled by a basic input-output system (BIOS). Some of the peripheral devices may be plug-and-play peripheral devices and therefore the data processing system may be able to register the plug-and-play devices.

For a portion of the peripheral devices, the data processing system may not be able to register the portion of the peripheral devices. The portion of the peripheral devices may include an unknown peripheral device.

To register and enable use of the unknown peripheral device, an interface may need to be generated. The interface may enable commands from the data processing system to be read by the unknown peripheral device and for the responses from the unknown peripheral device to be understood by the data processing system.

The interface may be generated by an interface generator hosted by a deployment manager. The interface generator may digest configuration data from the unknown peripheral device. The configuration data may be collected by an agent from the data processing system after attempts by the BIOS to register the unknown peripheral device.

Upon implementation, by the data processing system, of the interface from the deployment manager, the unknown peripheral device may be registered by the data processing system, commands from the data processing system may be read by the unknown peripheral device, and responses may be from the unknown peripheral device may be understood by the data processing system.

In an embodiment, a method for managing interfaces for peripheral devices is disclosed. The method may include (i) obtaining a notification that indicates that an unknown peripheral device is connected to a data processing system; (ii) obtaining, for the unknown peripheral device, configuration data comprising an enumeration of functionality of the peripheral device that may be invoked by the data processing system; (iii) obtaining, using the configuration data, an interface for interacting with the unknown peripheral device; and (iv) providing, using the data processing system, the unknown peripheral device, and the interface, computer implemented services.

Obtaining the notification may include receiving, from a startup management entity of the data processing system and by an agent responsible for generating interfaces to the peripheral devices, the notification.

The agent may be hosted by a management controller of the data processing system. The agent may be hosted by a processor of the data processing system.

Obtaining the configuration data may include (i) sending commands to the unknown peripheral device; and (ii) recording responses of the unknown peripheral device to the commands.

The configuration data may include relationships between the commands and the responses.

The interface may enable interaction between the unknown peripheral device and a host from the data processing system.

Obtaining the interface may include (i) sending the configuration data and host information of the data processing system to a deployment manager; and (ii) receiving the interface from the deployment manager.

The interface may translate a command from a host from the data processing system so that a peripheral device of the peripheral devices can understand the command and perform the command, and the interface translates a response from the peripheral device of the peripheral devices so that the host from the data processing system can receive the response and understand the response.

Providing computer implemented service, during startup of the data processing system, may include (i) providing use of the interface to a startup management entity orchestrating the startup of the data processing system; (ii) using, by the startup management entity, the interface to complete the startup and hand off management of the data processing system to another entity; and (iii) using, by the other entity, the interface to provide the computer implemented services.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, a system may use peripheral devices. A peripheral device of the peripheral devices may enable input of data into and/or output of the data from the system. The peripheral device may include a keyboard, mouse, speakers, and/or any other type of device which may operably connect a host system.

To input the data into or output the data from the system, the peripheral device may need to be connected to the system. The peripheral device may be connected through a wired and/or wireless connection. The wired and/or wireless connection may permit transmission of the data between the system and the peripheral device.

To further permit transmission of the data between the system and the peripheral device, an interface may need to be present between a host of the system and the peripheral device. The interface may translate communications between the host and the peripheral device. A translation of the communications may be necessary so that the host may be able to interpret messages from the peripheral device.

However, if an interface for the peripheral device is not available, the host system may be unable to interpret and interact with the peripheral device. For example, without having access to corresponding interfaces, then the host system may be unable to invoke functions of the peripheral device and interpret messages that are received from the peripheral device.

In general, embodiments disclosed here relate to systems and methods for managing interfaces for peripheral devices. The interfaces for the peripheral devices may be managed by dynamically generating interfaces for unknown peripheral devices (e.g., peripheral devices for which interfaces are not available). The interfaces may be dynamically generated by sending information (e.g., configuration data) regarding the unknown peripheral device to an interface generator. The interface generator may dynamically create and return an interface for the peripheral devices to the host system.

To identify whether any unknown peripheral devices are present, an agent may participate in start-up processes. To participate in the start-up processes, the agent may (i)

identify any unknown peripheral devices attached to a host device, and (ii) collect configuration data for any unknown peripheral devices.

During the collection of configuration data, the agent may send requests for information to an unknown peripheral devices. The agent may receive responses from the unknown peripheral devices. Through this process, all functionalities and corresponding responses from the unknown peripheral devices may be enumerated. The resulting configuration information may then be used to generate an interface for the unknown peripheral device.

To generate the interface, the agent may establish a connection with a remote entities and provide both the configuration information and remote access to the unknown peripheral device. The remote entities may include interface generators which may use the configuration information and/or access to generate interfaces for unknown peripheral devices.

The generated interfaces may be used to facilitate communications between host systems and previously unknown peripheral devices. The interface may be used to communicate by, for example, translating communications from the unknown peripheral device sent to a host into a form which is interpretable by the host. Similarly, the interface may be used to translate communications from the host to the unknown peripheral devices. In this manner, the unknown peripheral device and host system may communicate between one another. For example, the interface may enable the host system to invoke functionalities of the unknown peripheral devices.

Once in place, the startup process may continue to place the host system in a nominal mode of operation. During the nominal mode of operation, the host system and previously unknown peripheral devices may use the dynamically generated interface to continue to communicate.

To provide the above noted functionality, the system may include deployment 100, and deployment manager 104. Each of these components is discussed below.

Deployment 100 may include any number of data processing system 100A-100N. Data processing systems 100A-100N may provide the computer implemented services. While providing the computer implemented services, the data processing systems may interact with peripheral devices.

When a data processing system encounters an unknown peripheral device, the data processing system may cooperate with deployment manager 104. Deployment manager 104 may dynamically generate and provide interfaces for unknown peripheral devices.

Deployment manager 104 may, in addition to other services, provide interface generation services. To provide the interface generation services, deployment manager 104 may (i) connect with data processing systems that have encountered unknown peripheral devices, (ii) obtain, via the connections, information regarding the unknown peripheral devices, (iii) generate, using the obtained information, interfaces for the unknown peripheral devices, and (iv) facilitate communications between data processing systems and unknown peripheral devices using the interfaces.

Figure 2A:
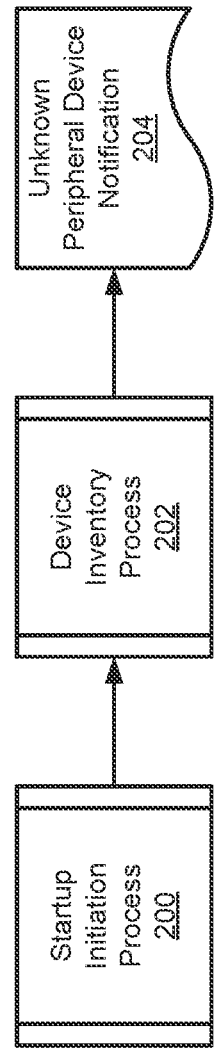
FIGS. 2A-2C show data flow diagrams illustrating operation of a system in accordance with an embodiment.
Figure 2B:
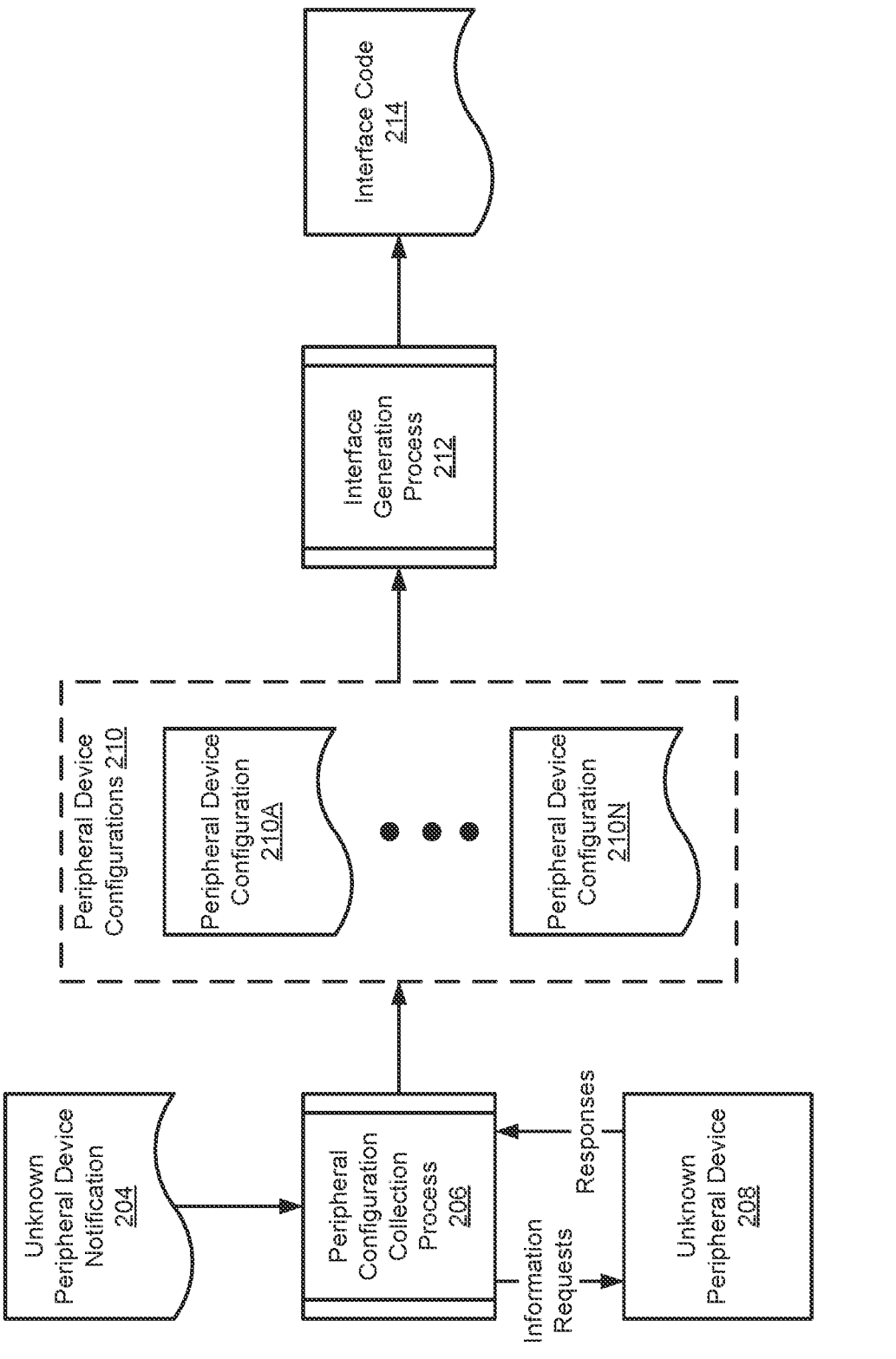
Figure 2C:
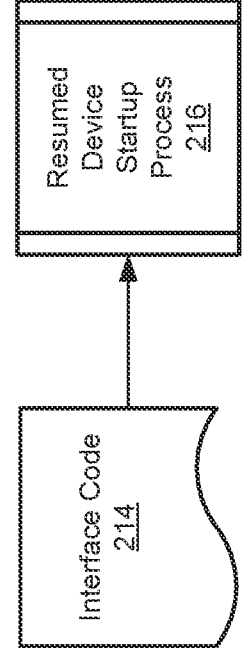
Figure 3:
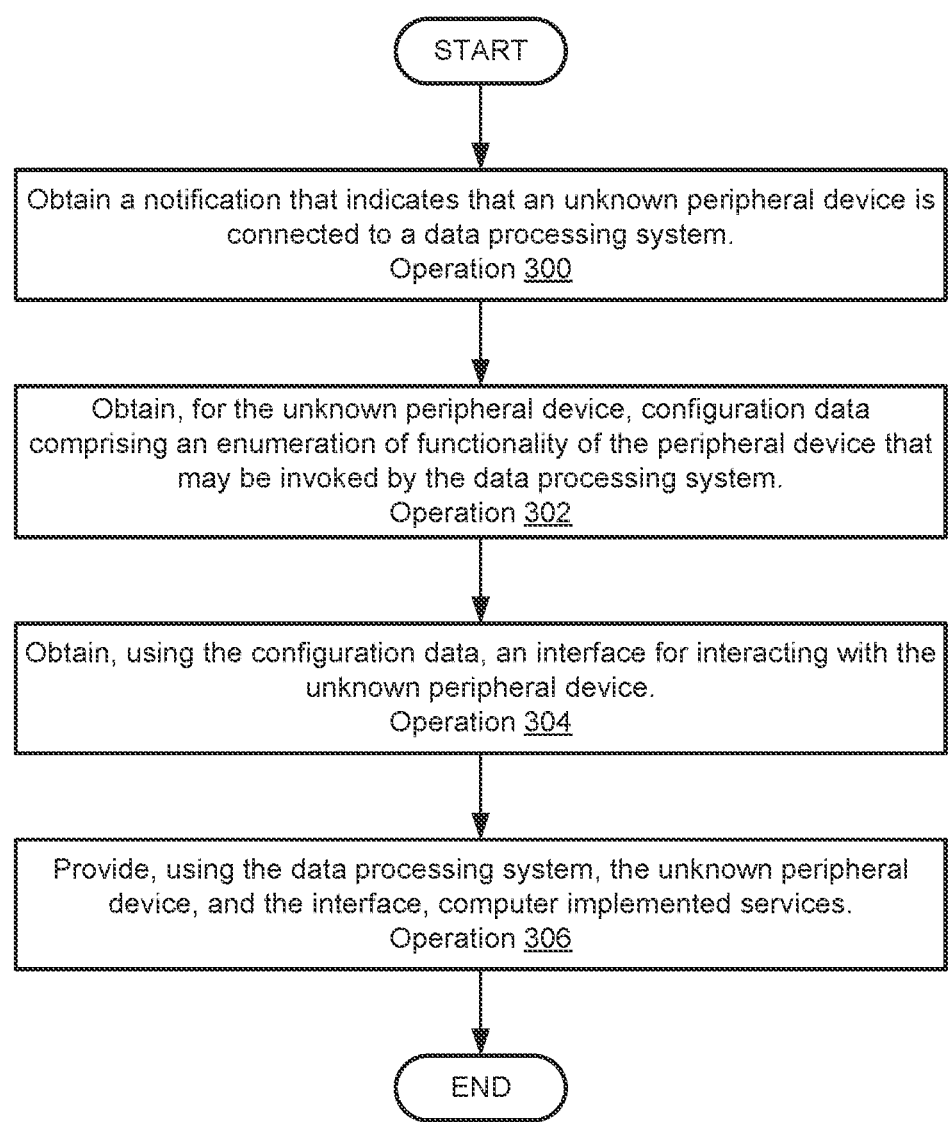
FIG. 3 shows flow a diagram illustrating a method in accordance with an embodiment.

While providing their functionality, any of deployment 100 and deployment manager 104 may perform all, or a portion, of the flows and methods shown in FIGS. 2A-3.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Figure 1B:
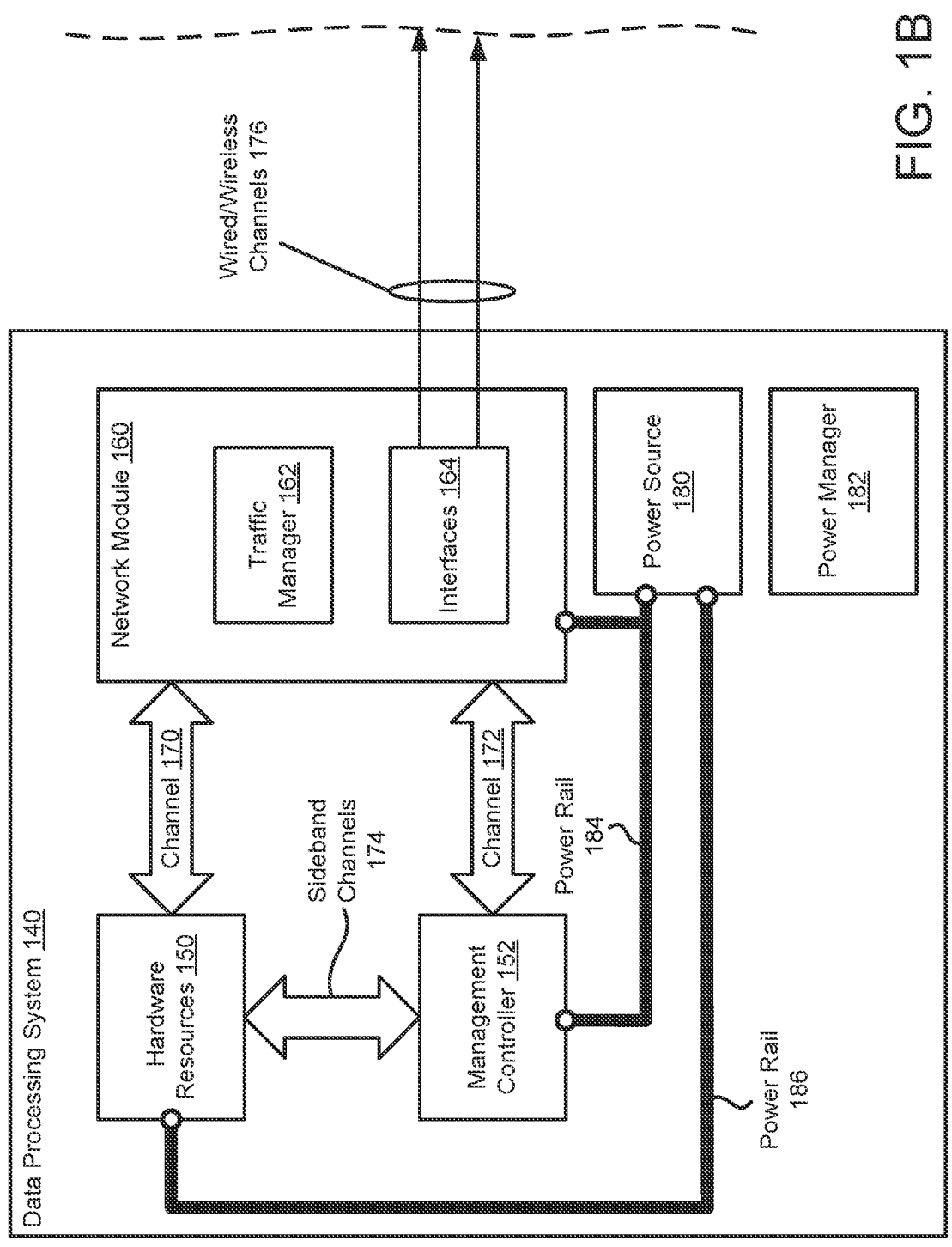

Turning to FIG. 1B, a diagram illustrating data processing system 140 in accordance with an embodiment is shown. Data processing system 140 may be similar to any of the data processing systems shown in FIG. 1B.

To provide computer implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may participate in interface generation for unknown peripheral devices, monitor various ongoing processes performed by the in-band components, may manage power distribution, thermal management, and/or or other functions of data processing system 140.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system 140. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 140 may appear to be two independent network entities, that may independently addressable, and otherwise unrelated to one another.

Using the out-of-band channel and management controller 152, interfaces for unknown peripheral devices may be generated. For example, management controller 152 may host a hardened operating system which may be used to characterize unknown peripheral devices connected to data processing system 140, establish communication with remote entities that host interface generator, obtain interfaces from the remote entities, etc. Thus, the interfaces may be generated securely, and in a manner that imposes lower levels of load on hardware resources 150.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Thus, data processing system 140 (e.g., similar to any of data processing systems 100A-100N) may facilitate interface generation for unknown peripheral devices.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 206, 214, etc.) is used to represent data structures, and a second set of shapes (e.g., 200, 202, etc.) is used to represent processes performed using and/or that generate data.

Turning to FIG. 2A, a first data flow diagram in accordance with an embodiment is shown. The first data flow diagram may illustrate data used in and data processing performed in identification of unknown peripheral devices.

To identify unknown peripheral devices, startup initiation process 200 may be performed. During startup initiation process 200, a data processing system may be turned on or otherwise begin a startup. For example, the data processing system may be turned on by supplying electricity to the data processing system. Supplying electricity to the data processing system may turn on components of the data processing system. Components of the data processing system may include one or more processors and the BIOS.

As the components of the data processing system turn on, device inventory process 202 may be performed. During device inventory process 202, an agent may be activated. The agent may perform a check of peripheral devices that are connected to the data processing system. The agent may perform the check by searching for peripheral devices and assigning a number (or other identifier) for each peripheral devices. However, the agent may not enable the peripheral devices for use by a host for the data processing system.

During the check, if any unknown peripheral devices are found, unknown peripheral device notification 204 may be generated. Unknown peripheral device notification 204 may indicate that a peripheral device has been found that is unknown.

If an unknown peripheral device notification is generated, subsequent processes (e.g., refer to FIG. 2B) may be performed to manage communication with unknown peripheral devices attached to the host system.

Turning to FIG. 2B, a second data flow diagram in accordance with an embodiment is shown. The second data flow diagram may illustrate data used in and data processing performed in generation of interface code for an unknown peripheral device.

To generate the interface code for the unknown peripheral device, peripheral configuration collection process 206 may be performed. To perform peripheral configuration collection process 206, the agent, mentioned in the description of FIG. 2A, may inventory all unknown peripheral devices. The agent may generate the inventory by scanning for the unknown peripheral devices.

When an unknown peripheral device (e.g., 208 in this example) is found, the agent may send information requests to unknown peripheral device 208. The information requests may include one or more commands to unknown peripheral device. 208. The commands may include input/output commands. The commands may also include tests for functionality of unknown peripheral device 208. The communications to unknown peripheral device 208 may enumerate all of the possible communications.

Responsive to the communications, unknown peripheral device 208 may generate various responses to the communications. The responses may any type of response (e.g., because the particular functions and corresponding responses are unknown to the host device). The memory locations for the operation of one or more of unknown peripheral device 208 in peripheral configuration collection process 206 may yield peripheral device configurations 210.

Peripheral device configurations 210 may include an inventory (e.g., 210A-210N) of the communications and responses for an unknown peripheral device (e.g., 208). Peripheral device configurations 210 may include, for example, data for responses to commands for registration requests, memory locations for the operation of each of one or more unknown peripheral device 208, and/or other information.

Once obtained, peripheral device configuration 210 may be used to create an interface for an unknown peripheral device. To develop interface code 214, interface generation process 212 may be performed. During interface generation process 212, peripheral device configurations 210 may be sent to deployment manager 104 or another entity, and/or access to the unknown peripheral device may be provided. Deployment manager 104 may receive peripheral device configurations 210. Peripheral device configurations 210 may be ingested by an interface generator hosted by deployment manager 104.

The interface generator may generate interface code 214 for peripheral device configurations 210. The interface generator may generate interface code 214 by developing interface code based on registration responses, the memory locations for the functionality of each of the one or more unknown peripheral device 208 in peripheral device configurations 210, and/or other information. The interface code may be generated using, for example, (i) a template that is populated based on peripheral device configurations 210, (ii) generative artificial intelligence, and/or other modalities.

Once interface code 214 is generated by the interface generator hosted by development manager 104, interface code 216 may be deployed by development manager 104 and received by the data processing system.

In the event that changes to the unknown peripheral device are made after generation of the interface, additional peripheral device configurations may be collected and used to update the interface. Thus, the interface may adapt over time to, for example, changes to the operation of peripheral devices. Similar interfaces hosted by other data processing systems may also be updated when an update for an instance of an interface is generated.

When generating the interface, any of the processes illustrated in FIG. 2B may be performed, for example, by the hardware resources (e.g., an agent or operating system may perform the processes), a management controller (e.g., an agent or operating system may perform the processes), by the deployment manager (e.g., a direct connection to the unknown peripheral may be established), and/or by the peripheral (e.g., an agent, container, etc. may be deployed to the peripheral, which may then perform the processes).

Once the interface is generated and in place, a startup process may then be completed.

Turning to FIG. 2C, a third data flow diagram in accordance with an embodiment is shown. The third data flow diagram may illustrate data used in and data processing performed in continuation of a startup of the data processing system.

To continue the startup of the data processing system, resumed device startup process 218 may be performed. During resumed device startup process 218, the data processing system may receive interface code 214 from deployment manager 104. The agent, mentioned in the descriptions of FIGS. 2A-2B, may deploy interface code 214. The agent may deploy interface code 214 by, for example, having a startup management entity load the interface code an initiate execution of the interface code. By doing so, a data processing system be aware of and use the executing code to communicate with a now-known peripheral device.

Once interface code 208 has been deployed, the agent may hand the startup of the data processing system to another entity. The other entity may continue other processes in the startup and/or complete startup of the data processing system.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1B may perform various methods to manage interfaces for peripheral devices. FIG. 3 illustrates a method that may be performed by the components of the system of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing interfaces for peripheral devices in accordance with an embodiment is shown. The method may be performed, for example, by any of the components of the system of FIGS. 1A-1B, and/or other components not shown therein.

At operation 300, a notification may be obtained that indicates that an unknown peripheral device is connected to a data processing system. The notification may be obtained by receiving, from a startup management entity of the data processing system, the notification. The notification may be received by accepting, by an agent, a message in response to an attempt to register the unknown peripheral device.

At operation 302, configuration data, comprising an enumeration of functionality of the peripheral device that may be invoked by the data processing system, may be obtained for the unknown peripheral device. The configuration data may be obtained by (i) sending commands to the unknown peripheral device and (ii) recording responses of the unknown peripheral device to the commands.

The commands may be sent to the unknown peripheral device by transmitting messages to the unknown peripheral device from the agent through a wired and/or wireless device by which the unknown peripheral device is connected to the data processing system. The responses of the unknown peripheral device to the commands may be recorded by (i) receiving, by the agent, the responses, (ii) inventorying the responses for each of the commands and their memory locations, and/or performing other operations.

At operation 304, an interface for interacting with the unknown peripheral device may be obtained using the configuration data. The interface may be obtained by (i) sending the configuration data and host information of the data processing system to a deployment manager and (ii) receiving the interface from the deployment manager. The configuration data and the host information may be sent to the deployment manager by transmitting the configuration data and the host information from the data processing system through a communication system to the deployment manager. The interface may be received transmitting the configuration data and the host information from the deployment manager through the communication system to the data processing system.

At operation 306, computer implemented services may be provided using the data processing system, the unknown peripheral device, and the interface. The computer implemented services may be provided, during the startup of the data processing system, by (i) providing use of the interface to a startup management entity orchestrating the startup of the data processing system; (ii) using, by the startup management entity, the interface to complete the startup and hand off management of the data processing system to another entity; and (iii) using, by the other entity, the interface to provide the computer implemented services.

Use of the interface to a startup management entity orchestrating the startup of the data processing system may be provided by assigning a portion of code from the interface to the unknown peripheral device. The interface may be used by the startup management entity to complete startup and hand off management of the data processing system to another entity by (i) registering, using the interface, the unknown peripheral device to the data processing system; (ii) completing startup tasks by the agent; and (iii) communicating, by the agent to the other entity, that the tasks by the agent have been completed. The interface may be used by the other entity by (i) sending commands from the data processing system through the interface to the unknown peripheral device and (ii) sending responses from the unknown peripheral device through the interface to the data processing system.

The method may end following operation 306.

Figure 4:
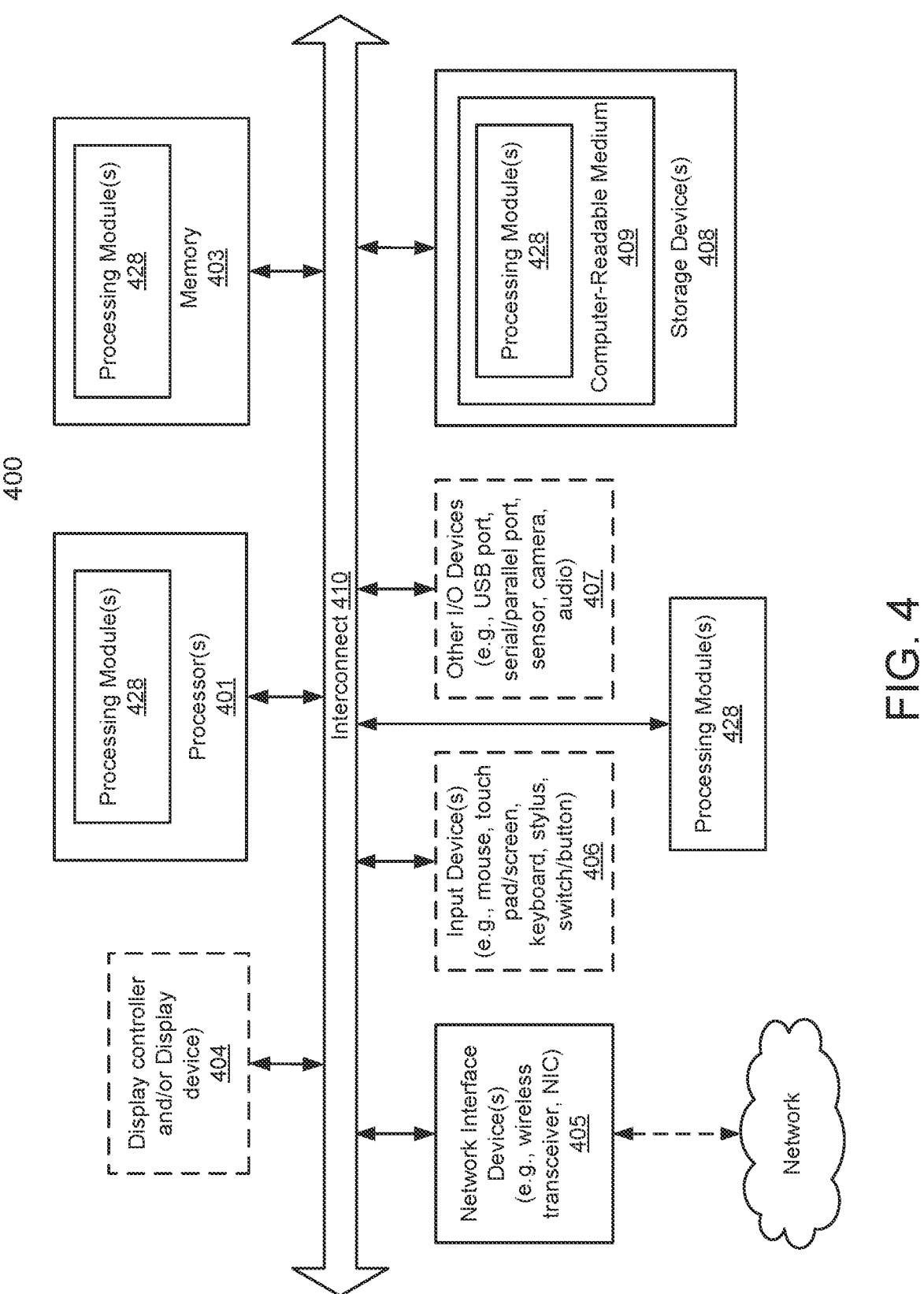
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir- ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com- puting device, that manipulates and transforms data repre- sented as physical (electronic) quantities within the com- puter system's registers and memories into other data similarly represented as physical quantities within the com- puter system memories or registers or other such informa- tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the opera- tions described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing interfaces for peripheral devices, the method comprising:
   obtaining a notification that indicates that an unknown peripheral device is connected to a data processing system;
   obtaining, for the unknown peripheral device, configura- tion data comprising an enumeration of functionality of the peripheral device that may be invoked by the data processing system;
   obtaining, using the configuration data, an interface for interacting with the unknown peripheral device, the interface being one of interfaces hosted and maintained by a single network module of the data processing system, the single network module being shared by a management controller and hardware resources and is adapted to use the interfaces to separately advertise endpoints used by other devices to communicate with each of the management controller and the hardware resources, and the other devices comprising the unknown peripheral device; and
   providing, using the data processing system, the unknown peripheral device, and the interface, computer imple- mented services.

2. The method of claim 1, wherein obtaining the notifi- cation comprises:
   receiving, from a startup management entity of the data processing system and by an agent responsible for generating interfaces to the peripheral devices, the notification.

3. The method of claim 2, wherein the agent is hosted by the management controller of the data processing system.

4. The method of claim 2, wherein the agent is hosted by a processor of the data processing system, the processor being one of the hardware resources.

5. The method of claim 1, wherein obtaining the configu- ration data comprises:
   sending commands to the unknown peripheral device; and
   recording responses of the unknown peripheral device to the commands.

6. The method of claim 5, wherein the configuration data comprises relationships between the commands and the responses.

7. The method of claim 1, wherein the interface enables interaction between the unknown peripheral device and a host from the data processing system.

8. The method of claim 1, wherein obtaining the interface comprises:
   sending the configuration data and host information of the data processing system to a deployment manager; and
   receiving the interface from the deployment manager.

9. The method of claim 1, wherein the interface translates a command from a host from the data processing system so that a peripheral device of the peripheral devices can under- stand the command and perform the command, and the interface translates a response from the peripheral device of the peripheral devices so that the host from the data pro- cessing system can receive the response and understand the response.

10. The method of claim 1, wherein providing computer implemented services comprises:
   during a startup of the data processing system:
      providing use of the interface to a startup management entity orchestrating the startup of the data processing system;
      using, by the startup management entity, the interface to complete the startup and hand off management of the data processing system to another entity; and
      using, by the other entity, the interface to provide the computer implemented services.

11. The method of claim 1, wherein the single network module uses the interfaces to separately advertise the end- points for the management controller and the hardware resources such that:
   first communications received via a first endpoint of the endpoints and meant for the hardware resources never flow through the management controller, and
   second communications received via a second endpoint of the endpoints and meant for the management controller never flow through the hardware resources.

12. A non-transitory machine-readable medium having instructions stored therein, which when executed by a data processing system, cause the data processing system to perform operations for managing interfaces for peripheral devices, the operation comprising:

obtaining a notification that indicates that an unknown peripheral device is connected to the data processing system;

obtaining, for the unknown peripheral device, configuration data comprising an enumeration of functionality of the peripheral device that may be invoked by the data processing system;

obtaining, using the configuration data, an interface for interacting with the unknown peripheral device, the interface being one of interfaces hosted and maintained by a single network module of the data processing system, the single network module being shared by a management controller and hardware resources and is adapted to use the interfaces to separately advertise endpoints used by other devices to communicate with each of the management controller and the hardware resources, and the other devices comprising the unknown peripheral device; and providing, using the data processing system, the unknown peripheral device, and the interface, computer implemented services.

13. The non-transitory machine-readable medium of claim 12, wherein obtaining the notification comprises:

receiving, from a startup management entity of the data processing system and by an agent responsible for generating interfaces to the peripheral devices, the notification.

14. The non-transitory machine-readable medium of claim 13, wherein the agent is hosted by the management controller of the data processing system.

15. The non-transitory machine-readable medium of claim 13, wherein the agent is hosted by a processor of the data processing system, the processor being one of the hardware resources.

16. The non-transitory machine-readable medium of claim 12, wherein obtaining the configuration data comprises:

sending commands to the unknown peripheral device; and recording responses of the unknown peripheral device to the commands.

17. A data processing system, comprising:

a processor; and a memory coupled to the processor to store instructions, which when executed by the data processing system, cause the data processing system to perform operations for managing interfaces for peripheral devices, the operations comprising:

obtaining a notification that indicates that an unknown peripheral device is connected to the data processing system;

obtaining, for the unknown peripheral device, configuration data comprising an enumeration of functionality of the peripheral device that may be invoked by the data processing system;

obtaining, using the configuration data, an interface for interacting with the unknown peripheral device, the interface being one of interfaces hosted and maintained by a single network module of the data processing system, the single network module being shared by a management controller and hardware resources and is adapted to use the interfaces to separately advertise endpoints used by other devices to communicate with each of the management controller and the hardware resources, and the other devices comprising the unknown peripheral device; and providing, using the data processing system, the unknown peripheral device, and the interface, computer implemented services.

18. The data processing system of claim 17, wherein obtaining the notification comprises:

receiving, from a startup management entity of the data processing system and by an agent responsible for generating interfaces to the peripheral devices, the notification.

19. The data processing system of claim 18, wherein the agent is hosted by the management controller of the data processing system.

20. The data processing system of claim 18 wherein the agent is hosted by the processor of the data processing system, the processor being one of the hardware resources.

* * * * *